US012717322B2

(12) United States Patent
Shao

(10) Patent No.: US 12,717,322 B2
(45) Date of Patent: Aug. 25, 2026

(54) METHODS AND INTERNET OF THINGS LARGE MODEL SYSTEMS FOR EMERGENCY SUPERVISION OF SMART CITY CATERING STORES

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/302,121

(22) Filed: Aug. 18, 2025

(65) Prior Publication Data

US 2025/0377657 A1 Dec. 11, 2025

(30) Foreign Application Priority Data

Jul. 17, 2025 (CN) ......................... 202510983779.1

(51) Int. Cl.
*G05B 23/02* (2006.01)
*G08B 21/12* (2006.01)
*G16Y 40/10* (2020.01)

(52) U.S. Cl.
CPC ....... *G05B 23/0289* (2013.01); *G05B 23/027* (2013.01); *G08B 21/12* (2013.01); *G16Y 40/10* (2020.01)

(58) Field of Classification Search
CPC ................................................. G05B 23/0289
(Continued)

(56) References Cited

U.S. PATENT DOCUMENTS

2003/0171879 A1* 9/2003 Pittalwala ................. F17D 5/00 702/34
2004/0031337 A1* 2/2004 Masaniello ........ G01N 29/4445 73/865.8

(Continued)

FOREIGN PATENT DOCUMENTS

CN 116862710 A 10/2023
CN 118153962 A 6/2024

(Continued)

OTHER PUBLICATIONS

Sun, Xiao et al., Research on the Construction of Intelligent Gas Management Platform, China Public Security. Academy Edition, 2: 23-25, 2018.

(Continued)

*Primary Examiner* — Travis R Hunnings
(74) *Attorney, Agent, or Firm* — METIS IP LLC

(57) ABSTRACT

A method and an IoT large model system for emergency supervision of smart city catering stores are provided. The method is executed by an emergency supervision management platform of the IoT large model system. The method includes obtaining store gas data from a store monitoring device installed in a store based on an emergency supervision object platform; determining aging data based on the store gas data; determining a device regulation parameter and a self-testing parameter based on the device aging degree, sending the device regulation parameter to a gas control device and sending the self-testing parameter to a self-testing device; controlling an opening amplitude of a pipeline valve based on the opening regulation value and controlling an operating power of the gas usage device based on the power regulation value; and controlling starting and stopping of the self-testing device based on the self-testing parameter.

16 Claims, 6 Drawing Sheets

(58) Field of Classification Search
USPC .......................................................... 340/632
See application file for complete search history.

(56) References Cited

U.S. PATENT DOCUMENTS

| | | | | |
|---|---|---|---|---|
| 2013/0325402 | A1* | 12/2013 | Vukojevic | H02J 13/10<br>702/181 |
| 2017/0308796 | A1* | 10/2017 | Heng | G06N 20/00 |
| 2018/0275100 | A1* | 9/2018 | Sutherland | G01N 29/04 |
| 2020/0191316 | A1* | 6/2020 | Du | G06Q 10/0635 |
| 2021/0181119 | A1* | 6/2021 | Michaud | G06F 16/535 |
| 2022/0010914 | A1* | 1/2022 | Du | F16L 55/26 |
| 2022/0057367 | A1* | 2/2022 | Claudio | G01N 29/04 |
| 2025/0111383 | A1 | 4/2025 | Shao et al. | |

FOREIGN PATENT DOCUMENTS

| | | | |
|---|---|---|---|
| CN | 119084831 | A | 12/2024 |
| CN | 119252979 | A | 1/2025 |
| CN | 119628217 | A | 3/2025 |
| JP | 2005337596 | A | 12/2005 |

OTHER PUBLICATIONS

Zhang, Xiaoye et al., Intelligent Gas Integrated Dispatch and Command System Based on Intelligent Control Technology, Chemical Management, 2019, 3 pages.
Zhou, Fengbai et al., A Brief Discussion on the Deepening of Urban Gas Safety Management, Technology and Enterprise, 2016, 2 pages.
Hui, Yougang, Energy saving measures in the design of gas boiler rooms, Equipment Management and Maintenance, 2018, 3 pages.

* cited by examiner

METHODS AND INTERNET OF THINGS LARGE MODEL SYSTEMS FOR EMERGENCY SUPERVISION OF SMART CITY CATERING STORES

CROSS-REFERENCE TO RELATED APPLICATIONS

This application claims priority to Chinese Patent Application No. 202510983779.1, filed on Jul. 17, 2025, the entire contents of which are hereby incorporated by reference.

TECHNICAL FIELD

The present disclosure relates to the field of emergency supervision, and in particular relates to a method and an Internet of Things (IoT) large model system for emergency supervision of smart city catering stores.

BACKGROUND

Commercial users typically have substantial gas demands, which are usually met through gas pipelines or bottled gas to support operational needs. However, some commercial users overlook the aging of gas storage devices, some gas appliances, and pipeline facilities due to the layout of stores and busy business schedules, as well as fail to implement adequate emergency precautions against emergencies. Frequent emergency inspections not only consume significant effort of the commercial users but are also ineffective. The key challenge lies in developing targeted emergency inspection prevention and treatment strategies for different users and different gas facilities, respectively.

Therefore, it is necessary to provide a method and an Internet of Things (IoT) large model system for emergency supervision of smart city catering stores, to realize emergency supervision for different users and different gas facilities.

SUMMARY

One or more embodiments of the present disclosure provide an IoT large model system for emergency supervision of smart city catering stores. The system includes an emergency supervision user platform, an emergency supervision service platform, an emergency supervision management platform, an emergency supervision sensor network platform, and an emergency supervision object platform, wherein the emergency supervision management platform is configured to: obtain store gas data from a store monitoring device installed in a store based on the emergency supervision object platform; determine aging data based on the store gas data, wherein the aging data includes a device aging degree of a gas usage device; and determine a device regulation parameter and a self-testing parameter based on the device aging degree, and send the device regulation parameter to a gas control device and send the self-testing parameter to a self-testing device, wherein the device regulation parameter includes an opening regulation value and a power regulation value; control an opening amplitude of a pipeline valve based on the opening regulation value and control an operating power of the gas usage device based on the power regulation value; and control starting and stopping of the self-testing device based on the self-testing parameter.

One or more embodiments of the present disclosure provide a method for emergency supervision of smart city catering stores, wherein the method is executed by the emergency supervision management platform of the Internet of Things (IoT) large model system for emergency supervision of smart city catering stores, and the method includes: obtaining the store gas data from the store monitoring device installed in the store based on the emergency supervision object platform; determining the aging data based on the store gas data, wherein the aging data includes the device aging degree of the gas usage device; and determining the device regulation parameter and the self-testing parameter based on the device aging degree, and sending the device regulation parameter to the gas control device and sending the self-testing parameter to the self-testing device, wherein the device regulation parameter includes the opening regulation value and the power regulation value; controlling the opening amplitude of the pipeline valve based on the opening regulation value and controlling the operating power of the gas usage device based on the power regulation value; and controlling starting and stopping of the self-testing device based on the self-testing parameter.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 2 is a flowchart illustrating an exemplary method for emergency supervision of smart city catering stores according to some embodiments of the present disclosure;

DETAILED DESCRIPTION

Figure 1:
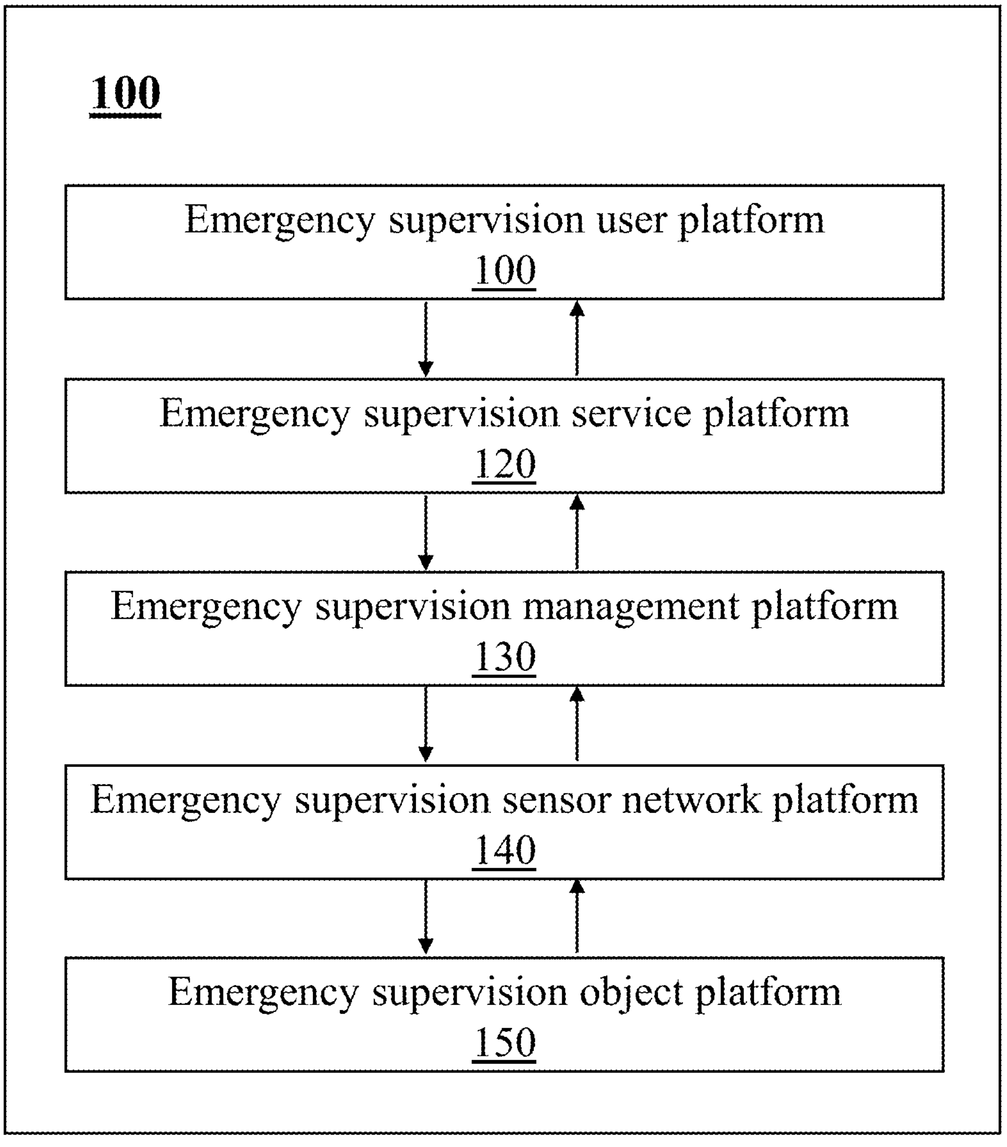
FIG. 1 is a schematic diagram illustrating an Internet of Things (IoT) large model system for emergency supervision of smart city catering stores according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an Internet of Things (IoT) large model system for emergency supervision of smart city catering stores according to some embodiments of the present disclosure.

In some embodiments, an IoT large model system for emergency supervision of smart city catering stores 100 may include an emergency supervision user platform 110, an emergency supervision service platform 120, an emergency supervision management platform 130, an emergency supervision sensor network platform 140, and an emergency supervision object platform 150.

The emergency supervision user platform 110 refers to a platform for a user to obtain emergency supervision information and issue an emergency supervision demand and instruction, which includes a government user sub-platform and a citizen user sub-platform. In some embodiments, the government user sub-platform is an operational connection platform for a higher-level government emergency supervision department, and the higher-level government emergency supervision department may issue the emergency supervision demand and instruction through the government user sub-platform, and obtain an emergency supervision event, status, progress, and other information. In some embodiments, the citizen user sub-platform supports a citizen user to view emergency information (e.g., a guide route, crowding in a plurality of areas, etc.) in real time and allows the citizen user to transmit an emergency event (e.g., events such as crowding, stampedes, gas leakage, etc.). In some embodiments, the emergency supervision user platform 110 may be connected to the emergency supervision service platform 120 via a communication module to transmit a user request. In some embodiments, the emergency supervision user platform 110 may include a third-party terminal, e.g., a smartphone, a tablet, a personal computer, a smartwatch, etc.

The emergency supervision service platform 120 refers to an intermediate layer between the emergency supervision user platform 110 and the emergency supervision management platform 130, which is configured to process user instruction and send the user instruction to the emergency supervision management platform 130, or send information from the emergency supervision management platform 130 to the user. In some embodiments, the emergency supervision service platform 120 may include a server, a gateway, and a router.

The emergency supervision management platform 130 refers to a control center of the IoT large model system for emergency supervision of smart city catering stores 100, which is configured to execute a method for emergency supervision of smart city catering stores. More descriptions regarding the method may be found in FIG. 2-FIG. 6 and related descriptions thereof.

In some embodiments, the emergency supervision management platform 130 may include hardware with computing capabilities such as a processor, a server, or a cluster of servers, etc. In some embodiments, the emergency supervision management platform 130 may further include a data center for storing data. In some embodiments, the emergency supervision management platform 130 may include a plurality of emergency sub-platforms, such as a social security event prevention and monitoring platform, etc. In some embodiments, the data center may be configured with a memory for storing data such as pipeline maintenance data, a distribution of pipelines, etc., and the plurality of emergency sub-platforms may be communicatively connected to a plurality of sensor sub-platforms.

The emergency supervision sensor network platform 140 refers to an intermediate layer between the emergency supervision management platform 130 and the emergency supervision object platform 150, which is configured to realize a communication connection between the emergency supervision management platform 130 and the emergency supervision object platform 150. In some embodiments, the emergency supervision sensor network platform 140 may include a communication transmission network and a routing device. In some embodiments, the emergency supervision sensor network platform 140 may include a plurality of sensor sub-platforms. Merely by way of example, a sensor sub-platform may be responsible for collecting data from an area and uploading the data to a corresponding emergency sub-platform.

The emergency supervision object platform 150 refers to a platform for monitoring. In some embodiments, the emergency supervision object platform 150 may be configured with a monitoring device, a plurality of types of sensors, a memory, and an evacuation device, etc.

In some embodiments of the present disclosure, the IoT large model for emergency supervision of smart city catering stores may form a closed loop of information operation among functional platforms, coordinate and operate regularly under the unified management of the emergency supervision management platform. By efficiently and precisely monitoring the aging degree of different gas usage devices, the operating power and self-test starting and stopping of the gas usage devices are controlled, thereby improving the processing efficiency of emergency supervision.

Figure 2:
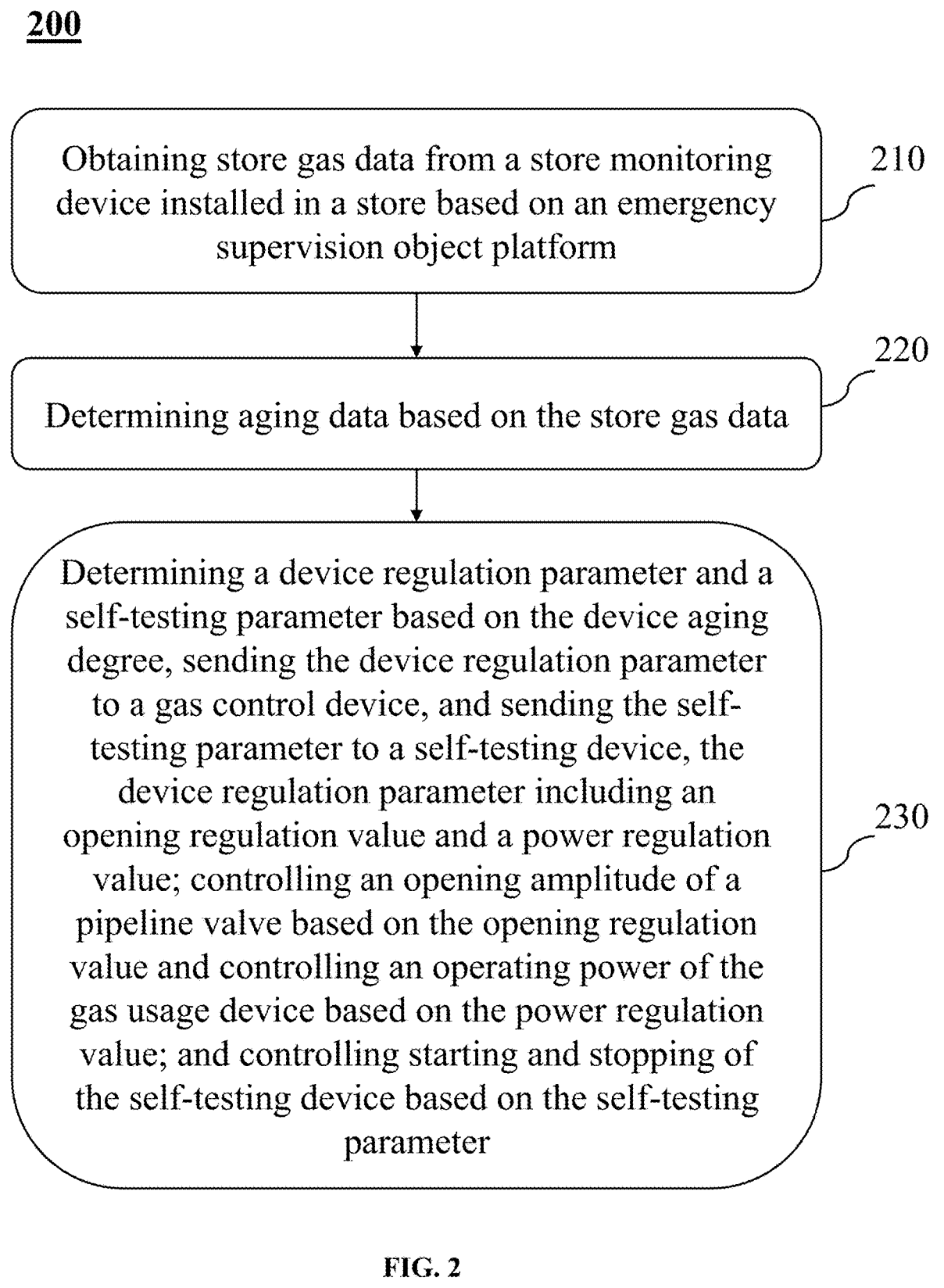

FIG. 2 is a flowchart illustrating an exemplary method for emergency supervision of smart city catering stores according to some embodiments of the present disclosure. As shown in FIG. 2, process 200 includes the following operations. In some embodiments, the process 200 may be executed by the emergency supervision management platform 130.

In 210, store gas data is obtained from a store monitoring device installed in a store based on an emergency supervision object platform.

The store gas data refers to data related to the gas usage condition in a commercial store. In some embodiments, the store gas data may include user usage data and device usage data.

The user usage data and the device usage data refer to data related to gas usage conditions by a user and a device, respectively, in the commercial store. For example, the user usage data may include a count of gas users, etc., and the device usage data may include a count of starting and stopping of a gas usage device, a gas usage power and a gas usage duration every time, etc.

In some embodiments, the store monitoring device may obtain the store gas data and upload the store gas data to the emergency supervision object platform 150. The emergency supervision object platform 150 may upload the store gas data to the emergency supervision management platform 130 for storage via the emergency supervision sensor network platform 140.

The store monitoring device refers to a device that monitors the gas usage condition in the commercial store. The store monitoring device may be communicatively connected to the emergency supervision object platform 150. In some embodiments, the store monitoring device may include an infrared device (e.g., a thermal imaging camera), a high-definition camera, an electrical sensor, etc. The infrared device and/or the high-definition camera may be configured with an image recognition function.

In some embodiments, the store monitoring device may be installed at a predetermined location in the commercial store, and the predetermined location may be set by a person skilled in the art based on experience.

In 220, aging data is determined based on the store gas data.

The aging data refers to data related to the aging degree of the gas usage device. In some embodiments, the aging data includes a device aging degree of the gas usage device.

In some embodiments, the emergency supervision management platform 130 may determine the device aging degree in a plurality of ways. For example, the emergency supervision management platform 130 may determine a cumulative count of gas users, a gas usage frequency (i.e., a cumulative count of starting and stopping), a cumulative gas usage duration, and an average gas usage power of the gas usage device based on the store gas data, perform a normalization on the cumulative count of gas users, the gas usage frequency, the cumulative gas usage duration, and the average gas usage power, determine an aging score, and designate the aging score as the device aging degree. A normalization manner may include one of Min-Max normalization, Z-score normalization, etc.

Merely by way of example, the aging score may be determined by the following equation (1):

$$S=\omega_1\times P+\omega_2\times F+\omega_3\times T+\omega_4\times W. \quad (1)$$

S denotes the aging score; P denotes a normalized value of the cumulative count of gas users; F denotes a normalized value of the gas usage frequency of the gas usage device; T denotes a normalized value of the cumulative gas usage duration of the gas usage device; W denotes a normalized value of the average gas usage power of the gas usage device; and $\omega_1$, $\omega_2$, $\omega_3$, and $\omega_4$ denote a coefficient of the count of gas users, a coefficient of the gas usage frequency, a coefficient of the gas usage duration, and a coefficient of the gas usage power, respectively, which may be set by a person skilled in the art based on experience.

More descriptions regarding determining the aging data may be found in related descriptions below.

In 230, a device regulation parameter and a self-testing parameter are determined based on the device aging degree, the device regulation parameter is sent to a gas control device, and the self-testing parameter is sent to a self-testing device, where the device regulation parameter includes an opening regulation value and a power regulation value; an opening amplitude of a pipeline valve is controlled based on the opening regulation value, and an operating power of the gas usage device is controlled based on the power regulation value; and starting and stopping of the self-testing device is controlled based on the self-testing parameter.

The device regulation parameter refers to a parameter related to regulating the operation of the gas usage device. In some embodiments, the device regulation parameter includes a gas usage device to be regulated and a control parameter (e.g., starting/stopping, power regulation, etc.) corresponding to the gas usage device to be regulated.

The self-testing parameter refers to a parameter related to self-testing of a device. In some embodiments, the self-testing parameter includes a self-testing device to be started and a control parameter corresponding to the self-testing device. The self-testing device is configured to test the gas usage device, and the self-testing device may include a pipeline pressure monitoring device, a vibration sensor, a noise analyzer, etc.

In some embodiments, the emergency supervision management platform 130 may determine the device regulation parameter and the self-testing parameter in a plurality of ways.

For example, the emergency supervision management platform 130 may, in response to an aging score of a gas usage device being greater than a predetermined aging threshold, determine the gas usage device as an aging device, determine the aging device as the gas usage device to be regulated in the device regulation parameter. The aging threshold may be set to a plurality of levels, and each level corresponds to a different control parameter. For example, when the aging score is greater than a first aging threshold, the control parameter is to reduce the power, and a regulation amplitude may be positively correlated to the aging score. When the aging score is greater than a second aging threshold, the control parameter is to close the device. As another example, the emergency supervision management platform 130 may determine associated pipelines of the aging device as a pipeline to be tested. Similar to the previous example, in response to the aging score being greater than a predetermined scoring threshold, the emergency supervision management platform 130 may turn down or close a valve of the pipeline to be tested, and the regulation magnitude is positively related to the aging score.

More descriptions regarding the associated pipelines may be found in operation 320 in FIG. 2 and related descriptions thereof.

More descriptions regarding determining the device regulation parameter and the self-testing parameter may be found in related descriptions below.

The opening regulation value is used to regulate an opening degree of a pipeline valve. The power regulation value is used to regulate the power of the device. In some embodiments, the emergency supervision management platform 130 may control the opening amplitude of the valve of the pipeline to be tested based on the opening regulation value and control the operating power of the gas usage device based on the power regulation value. In some embodiments, the emergency supervision management platform 130 controls the starting and stopping of the self-testing device based on the self-testing parameter. The emergency supervision management platform 130 may determine the self-testing device corresponding to the pipeline to be tested and the aging device as a self-testing device to be started in the self-testing parameter.

In some embodiments, the emergency supervision management platform 130 effectively realizes monitoring the aging degree of the gas usage device used in the store by obtaining the store gas data of the commercial store, and regulates the device based on the aging degree, which extends the service life of the device, thereby reducing the risk of accidents and providing a good foundation for emergency preparedness.

In some embodiments, the emergency supervision management platform 130 may generate a leak alarm parameter based on the aging data and send the leak alarm parameter to a leak alarm device of the store.

The leak alarm parameter is used to control the leak alarm device. In some embodiments, the leak alarm parameter controls triggering of the leak alarm device based on a leak alarm threshold. For example, the leak alarm device is configured to issue an alarm in response to a monitoring gas concentration being greater than the leak alarm threshold.

In some embodiments, the emergency supervision management platform 130 may reduce the leak alarm threshold in response to the aging device existing in a radiation range of the leak alarm device. The radiation range may be predetermined by a technician based on experience. A base value and a reduction magnitude of the leak alarm threshold may be predetermined by a person skilled in the art based on experience, and the reduction magnitude of the leak alarm threshold is positively correlated with a count of aging devices in the radiation range of the leak alarm device.

The risk of leakage may increase due to seal wearing, pipeline corrosion, sensor aging, etc., during the long-term operation of the gas usage device. The fixed threshold alarm mechanism may result in missed or false alarm. Therefore, dynamically regulating the leakage alarm threshold based on the device aging degree may improve the accuracy and safety of gas leakage monitoring.

Figure 3:
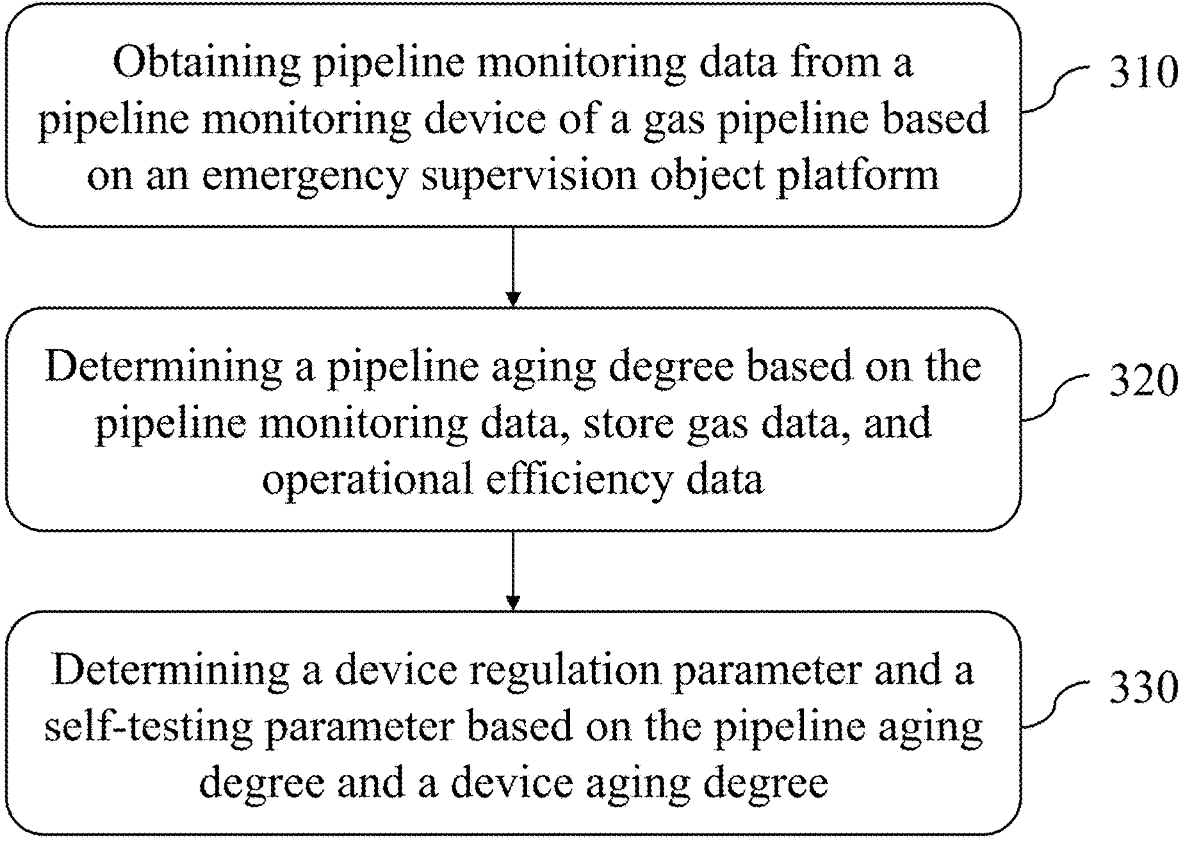
FIG. 3 is a flowchart illustrating an exemplary method for determining a device regulation parameter and a self-testing parameter according to some embodiments of the present disclosure.

FIG. 3 is a flowchart illustrating an exemplary method for determining a device regulation parameter and a self-testing parameter according to some embodiments of the present disclosure. As shown in FIG. 3, process 300 includes the following operations. In some embodiments, the process 300 may be executed by the emergency supervision management platform 130.

In 310, pipeline monitoring data is obtained from a pipeline monitoring device of a gas pipeline based on the emergency supervision object platform.

The pipeline monitoring data refers to data related to the operating status of the gas pipeline and the environment in which the gas pipeline is located. In some embodiments, the pipeline monitoring data includes a pipeline outside pressure, a pipeline inside pressure, and buried environment data. The buried environment data includes pH value, humidity, temperature, etc., of the environment in which the gas pipeline is buried.

In some embodiments, the pipeline monitoring device may obtain the pipeline monitoring data in real time or at a regular interval.

The pipeline monitoring device refers to a device for monitoring the internal and external environment of the gas pipeline. For example, the pipeline monitoring device may include a pressure sensor, a corrosion-resistant pH electrode, a temperature sensor, a humidity sensor, etc.

In 320, the pipeline aging degree is determined based on the pipeline monitoring data, the store gas data, and operational efficiency data.

More descriptions regarding the store gas data may be found in operation 210 and the related descriptions thereof.

The operational efficiency data refers to data related to the efficiency when a gas usage device operates. In some embodiments, the operational efficiency data includes historical temperature data or historical temperature change data, and a historical count of used gas (e.g., a count of used gas in a historical week) when the gas usage device operates. The emergency supervision management platform 130 may read the operational efficiency data from a data center.

In some embodiments, the aging data further includes the pipeline aging degree of a store pipeline system. The store pipeline system refers to a gas pipeline system corresponding to the store, which includes a through-wall pipeline, a buried pipeline, etc. The pipeline aging degree is used to evaluate the aging degree of the gas pipeline.

In some embodiments, the emergency supervision management platform 130 may determine a pipeline aging rate based on the pipeline monitoring data, the store gas data, and the operational efficiency data, and determine the pipeline aging degree based on the pipeline aging rate.

The pipeline aging rate is used to evaluate the aging rate of the gas pipeline. In some embodiments, the emergency supervision management platform 130 may construct an aging feature vector based on an average value of the pipeline monitoring data at a plurality of time points, an average value of device usage data of the gas usage device connected to the gas pipeline at the plurality of time points, and the average value of the operational efficiency data of the gas usage device at the plurality of time points. The emergency supervision management platform 130 may query a first vector database based on the aging feature vector and designate a reference pipeline aging rate corresponding to a reference aging feature vector that satisfies a predetermined requirement as the pipeline aging rate. More descriptions regarding the device usage data may be found in the operation 210 in FIG. 2 and related descriptions thereof, and the predetermined requirement may include one of a vector similarity between the aging feature vector and the reference aging feature vector being greater than a similarity threshold and a vector distance between the aging feature vector and the reference aging feature vector being less than a distance threshold, etc. The similarity threshold and the distance threshold may be set by a person skilled in the art based on experience.

The first vector database may include one of Milvus, Faiss, etc. The first vector database contains a plurality of reference aging feature vectors and reference pipeline aging rates corresponding to the plurality of reference aging feature vectors. The first vector database may be constructed based on experimental data or historical data. The construction operations include constructing a reference aging feature vector based on an average value of actual pipeline monitoring data at a plurality of reference time points, an average value of actual device usage data of a gas usage device connected to a gas pipeline at the plurality of reference time points, and an average value of actual operational efficiency data of the gas usage device at the plurality of reference time points in the experimental data or the historical data; recording a reference aging rate at a subsequent predetermined time period; obtaining a plurality of reference feature vectors and reference pipeline aging rates corresponding to the plurality of reference feature vectors by the above manner, and placing the plurality of reference feature vectors and reference pipeline aging rates corresponding to the plurality of reference feature vectors into the first vector database.

In some embodiments, the pipeline aging rate is a change rate of the pipeline aging degree per unit of time.

In some embodiments, the emergency supervision management platform 130 may determine the pipeline aging degree based on the pipeline aging rate and a pipeline usage period. Merely by way of example, the pipeline aging degree may be the product of the pipeline aging rate and the pipeline usage period. The pipeline usage period may be determined based on a time point when the gas pipeline was actually placed in service to a current time point, and the time point when the gas pipeline was actually placed in service may be determined from a recorded construction record.

In some embodiments, the emergency supervision management platform 130 may further determine the device aging degree of the gas usage device based on the pipeline aging degree of associated pipelines of the gas usage device.

In some embodiments, the emergency supervision management platform 130 may determine a gas pipeline whose path distance from the gas usage device is less than a predetermined threshold as an associated pipeline. The predetermined threshold is positively correlated to aging impact data of the gas usage device. More descriptions regarding the aging impact data may be found in the related descriptions below.

The path distance is used to quantify a topological connection hierarchy relationship between the gas usage device and gas pipeline nodes. For example, a path distance of a gas pipeline directly connected to the gas usage device is 0, and a path distance from an upper gas pipeline of the gas pipeline to the gas usage device is 1.

In some embodiments, the emergency supervision management platform 130 may appropriately increase the weight of the coefficient of the gas usage duration in the formula (1) based on the pipeline aging degree. The increasing magnitude may be predetermined.

Pipeline aging can cause more impurities to enter the gas, which affects the aging condition of the device that uses gas. Therefore, considering the pipeline aging degree while determining the device aging degree can improve the evaluation accuracy of the aging degree.

In 330, a device regulation parameter and a self-testing parameter are determined based on the pipeline aging degree and the device aging degree.

In some embodiments, in response to the pipeline aging degree of the gas pipeline being greater than a pipeline aging threshold, the emergency supervision management platform 130 may determine the device regulation parameter and the self-testing parameter like the manner in operation 230.

The evaluation accuracy of the aging degree of devices related to gas usage in the store may be improved by determining the pipeline aging degree and further determining the device regulation parameter and the self-testing parameter based on the pipeline aging degree, so as to reasonably regulate the device and better guard against risk.

In some embodiments, the emergency supervision management platform 130 may further determine the aging impact data based on the store gas data and gas storage location data, determine a judgmental threshold based on the aging impact data, and determine the device regulation parameter and the self-testing parameter based on the judgmental threshold and the aging data.

The gas storage location data refers to data related to a gas storage location. For example, the gas storage location data includes a gas storage location (e.g., locations of a gas storage room, a gas storage warehouse, etc.). In some embodiments, the emergency supervision management platform 130 may determine the gas storage location data from a construction drawing of a gas system.

The aging impact data is used to characterize an impact degree of the leak due to aging of the gas usage device and/or the gas pipeline. In some embodiments, the aging impact data may include device impact data and pipeline impact data, which are used to characterize impact degrees of leaks due to aging of the gas usage device and the gas pipeline, respectively.

In some embodiments, the device impact data is positively correlated with a count of people in a first range of the gas usage device and negatively correlated with a distance between the gas usage device and a gas storage location that satisfies a predetermined rule. The emergency supervision management platform 130 may query a first predetermined table to determine the device impact data based on the location of the gas usage device.

The count of people in the first range may be obtained through statistics, and the predetermined rule may include a distance between the gas usage device and the storage location being less than a distance threshold. The distance threshold, the first range, and the first predetermined table may be predetermined based on experience. The first predetermined table includes a plurality of counts of people in the first range of reference gas usage devices, distances between the reference gas usage devices and reference gas storage locations that satisfy the predetermined rule, and the corresponding device impact data.

In some embodiments, the pipeline impact data is positively correlated with a count of people in a second range of the gas pipeline, negatively correlated with a distance between the gas pipeline and the gas storage location that satisfies the predetermined rule, and positively correlated with a usage frequency of the gas usage device connected to the gas pipeline. The emergency supervision management platform 130 may determine the pipeline impact data by querying a second predetermined table based on the location of the gas pipeline.

The count of people in the second range may be obtained through statistics, and the second range and the second predetermined table may be predetermined based on experience. The second predetermined table includes a plurality of counts of people in the second range of reference gas pipelines, distances between the reference gas pipelines and the reference gas storage locations that satisfy the predetermined rules, the usage frequencies of the gas usage devices connected to the reference gas pipelines, and the corresponding pipeline impact data.

The judgmental threshold includes aging threshold and the pipeline aging threshold. In some embodiments, the aging impact data is negatively correlated with the judgmental threshold, e.g., the larger the aging impact data, the smaller the judgmental threshold.

In some embodiments, in response to the aging data being greater than the judgmental threshold regulated based on the aging impact data, the emergency supervision management platform 130 may determine the device regulation parameter and the self-testing parameter like the manner in operation 230.

The gas usage device and the gas pipeline gradually deteriorate with increasing service life, and the sealability and structural integrity of the gas usage device and the gas pipeline decline, thereby increasing the risk of gas leakage. When the aged gas usage device and gas pipeline are located in a densely populated area or close to the gas storage location, once a leakage occurs, a serious safety accident may be caused, thereby resulting in widespread injuries and property damage. Therefore, the aging impact data is introduced to enhance monitoring and maintenance, which may reduce potential risk. In addition, the aging degree can be judged more accurately by dynamically regulating the judgmental threshold through introducing aging impact data.

In some embodiments, the emergency supervision management platform 130 may further obtain pipeline distribution data from the data center, construct an aging feature map based on the pipeline distribution data, the pipeline monitoring data, the store gas data, and pipeline feature data, and determine the aging data based on the aging feature map. More descriptions regarding the data center may be found in the description in FIG. 1.

The pipeline distribution data is used to characterize the spatial distribution of the gas pipeline. For example, the pipeline distribution data may include locations of a plurality of gas pipelines, connection nodes between the plurality of gas pipelines, etc.

The pipeline feature data is used to characterize a structural feature of the gas pipeline. For example, the pipeline feature data may include a material, a length, a diameter, a thickness, etc., of the gas pipeline. The emergency supervision management platform 130 may read the pipeline distribution data and the pipeline feature data from the data center.

The aging feature map is used to characterize the spatial distribution and the aging feature of the gas pipeline. In some embodiments, the aging feature map may include nodes and edges, and the nodes include connection nodes and device nodes.

A connection node is used to characterize the connection between gas pipelines. In some embodiments, the connection node may include a connection node feature. For example, the connection node feature may include a connector type at one or more time points, etc.

A device node is used to characterize the gas usage device. In some embodiments, the device node may include a device node feature. For example, the device node feature may include the device usage data, device feature data (e.g., a device type, a device installation time, etc.), the operational efficiency data, etc., at one or more time points. The emergency supervision management platform 130 may read the device feature data from the data center. More descriptions regarding the device usage data may be found in operation 210 and related descriptions thereof, and more descriptions regarding the operational efficiency data may be found in operation 320 and related descriptions thereof.

The above connection node feature and the device node feature constitute node features.

The edge is used to characterize the gas pipeline. In some embodiments, the edge may include an edge feature. For example, the edge feature may include the pipeline monitoring data, the pipeline feature data, etc., at one or more time points. More descriptions regarding the pipeline monitoring data may be found in operation 310 and related descriptions thereof.

In some embodiments, the node features of the nodes and the edge features of the edges correspond to different time features. A time feature refers to a time point or a time period corresponding to the node features and the edge features.

In some embodiments, the time features of the node features and the time features of the edge features are positively correlated to the gas usage device, the pipeline aging degree, and the aging impact data corresponding to the node features and the edge features, respectively.

It is possible to accurately reflect the status change of the device and the pipeline in different time periods by correlating the time features of the node features and the time features of the edge features with the aging degree and and the aging impact data of the device and the pipeline. The time features may be dynamically regulated as change of the aging degree and the aging impact data of the device or the pipeline. For example, the device or the pipeline with a higher aging degree may include more corresponding historical data, and the historical data of high-risk objects are more fully utilized, thus helping the emergency supervision management platform to discover potential problems.

In some embodiments, the emergency supervision management platform 130 may determine the aging data based on the aging feature map through an aging determination model.

In some embodiments, the aging determination model may be a machine learning model. For example, the aging determination model may be a graph neural network (GNN) model, etc., or a combination of one or more of other customized models.

Figure 4:
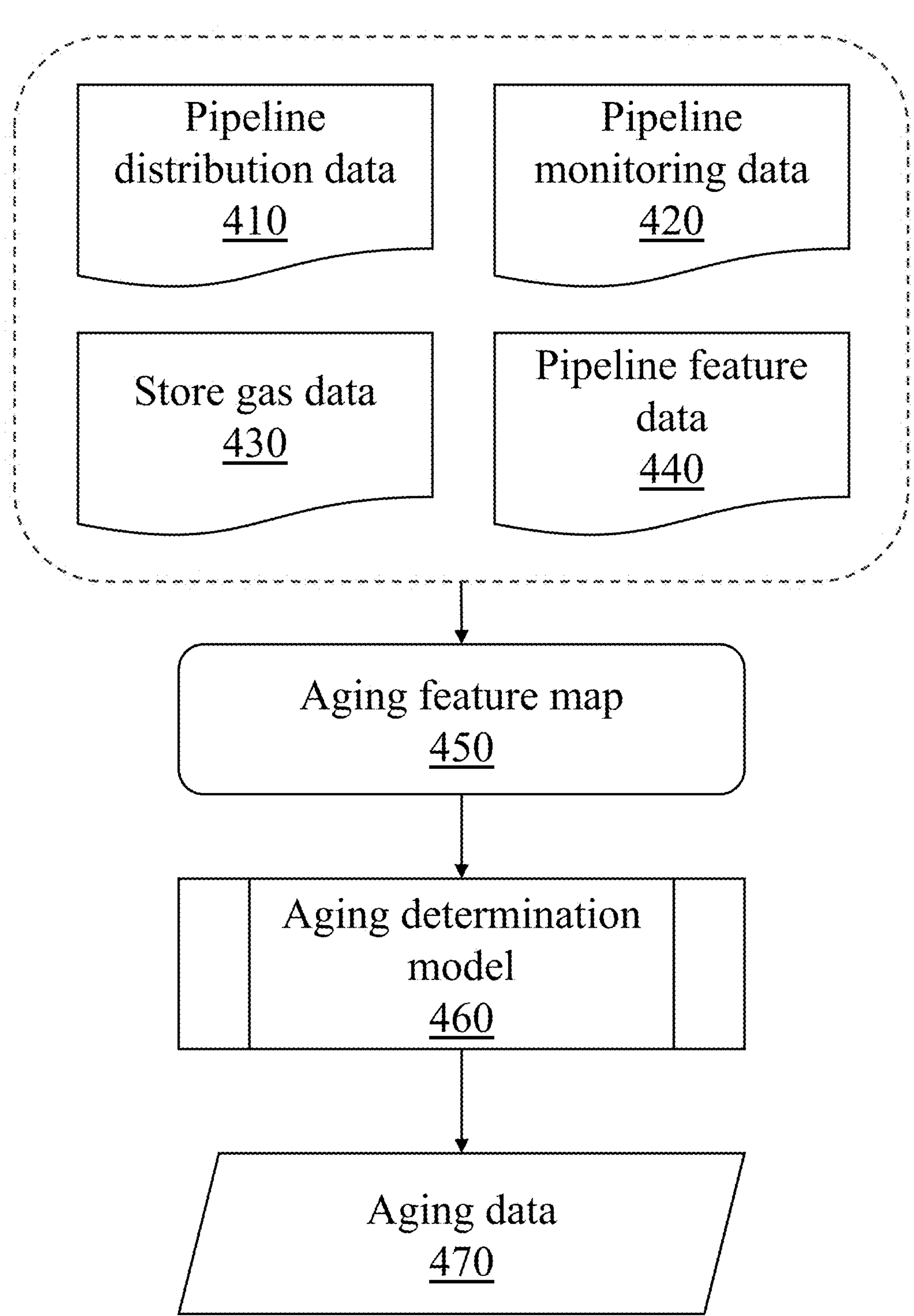
FIG. 4 is a schematic diagram illustrating an exemplary aging determination model according to some embodiments of the present disclosure.

FIG. 4 is a schematic diagram illustrating an exemplary aging determination model according to some embodiments of the present disclosure In some embodiments, as shown in FIG. 4, an input of the aging determination model 460 may include an aging feature map 450, and an output of the aging determination model 460 may include aging data 470. The aging feature map 450 may be constructed based on pipeline distribution data 410, pipeline monitoring data 420, store gas data 430, and pipeline feature data 440.

In some embodiments, the aging determination model may be obtained by training a plurality of first training samples with first labels. The first training samples include a sample aging feature map constructed based on sample pipeline distribution data, sample pipeline monitoring data, sample store gas data, sample device efficiency data, sample device feature data, sample pipeline feature data. The first labels include aging data obtained by actually executing the testing on the first training samples.

In some embodiments, the training of the aging determination model may be executed via the emergency supervision management platform 130 or an external server. For example, the emergency supervision management platform 130 executes a plurality of rounds of iterations. At least one round of iteration includes selecting one or more first training samples, inputting the one or more first training samples into an initial aging determination model, obtaining one or more model prediction outputs corresponding to the one or more first training samples, substituting the one or more model prediction outputs and one or more first labels of the one or more first training samples into a predefined loss function, determining a value of the loss function, and reversely updating a model parameter of the initial aging determination model based on the value of the loss function. The operation may be executed using a plurality of manners. For example, the update may be executed based on a gradient descent algorithm. The iteration ends when an end-of-iteration condition is satisfied, and a trained aging determination model is obtained.

The various relevant parameters of the device and the pipeline can be reflected by constructing an aging feature map, and the accuracy of determining the aging data can be improved based on the aging feature map to determine the aging data through the aging determination model, which is conducive to the emergency supervision management platform for preventing risk better.

In some embodiments, the emergency supervision management platform 130 may determine a pressure alarm parameter based on the aging data, the pipeline feature data, and the pipeline monitoring data, and send the pressure alarm parameter to a pressure alarm device of a store.

The pressure alarm parameter is used to control the triggering of the pressure alarm device based on a safe pressure threshold. The pressure alarm device is used to issue an alarm in response to the pressure of a pipeline of the store pipeline system being greater than the safe pressure threshold.

In some embodiments, the emergency supervision management platform 130 may determine the safe pressure threshold in a plurality of ways.

For example, the emergency supervision management platform 130 may determine a corresponding safe pressure threshold by querying a third predetermined table based on the pipeline aging degree and the thickness of the gas pipeline. The third predetermined table may be constructed based on historical data or through an experimentation. The third predetermined table contains pipeline aging degrees and thicknesses of a plurality of reference gas pipelines and corresponding reference safe pressure thresholds. The higher the pipeline aging degree and the lower the thickness of the reference gas pipeline, the lower the reference safe pressure threshold.

As another example, the emergency supervision management platform 130 may construct a pressure feature vector based on the pipeline aging degree and the pipeline feature data and determine the safe pressure threshold by querying a second vector database based on the pressure feature vector.

The second vector database includes a plurality of reference pressure feature vectors and reference safety thresholds corresponding to the plurality of reference pressure feature vectors. The manner for constructing the second vector database is similar to the manner for constructing the first vector database, which may be referred to in descriptions above.

In some embodiments, the emergency supervision management platform 130 may further measure a pressure change magnitude of the gas pipeline during a predetermined time period based on a pressure sensor and adaptively regulate the safe pressure threshold based on the pressure change magnitude. For example, if the pressure change magnitude is large, the safe pressure threshold is reduced. The reduction magnitude of the safe pressure threshold may be predetermined by a person skilled in the art based on experience, and more descriptions regarding the pressure sensor may be found in operation 310 and related descriptions thereof.

The pressure resistance may be reduced due to seal wearing, pipeline corrosion, fatigue damage, etc., during the long-term operation of the gas pipeline. The fixed threshold alarm mechanism may result in missed or false alarm. Therefore, dynamically regulating the safe pressure threshold based on the pipeline aging degree can improve the accuracy and safety of gas leakage monitoring.

Figure 5:
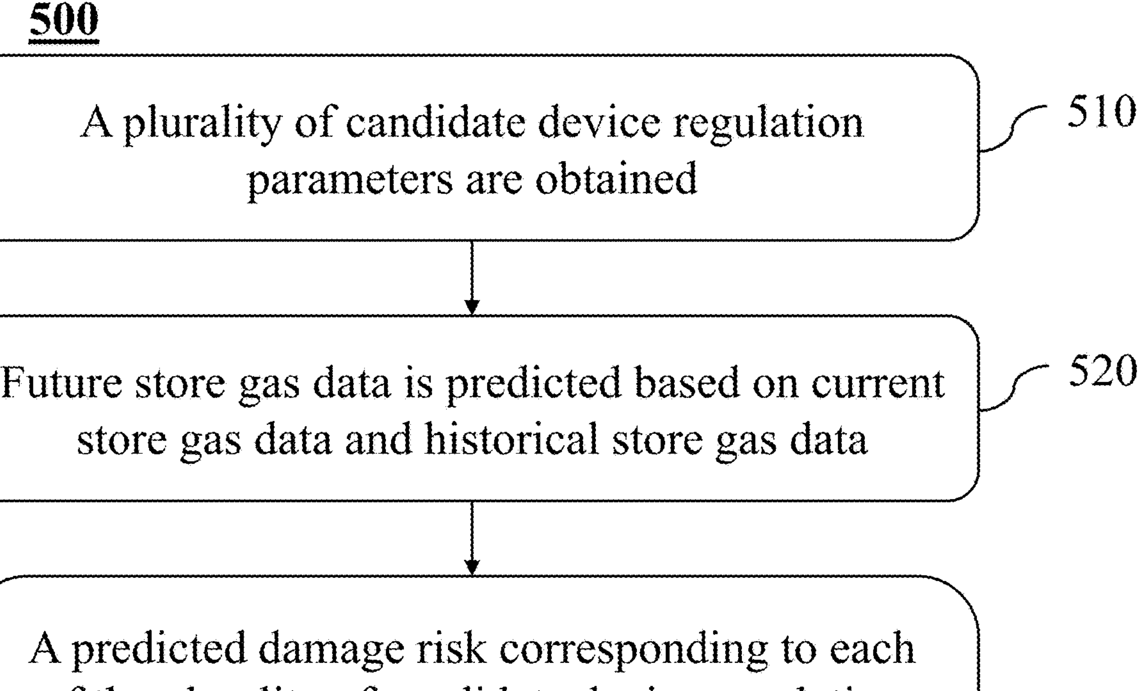
FIG. 5 is another flowchart illustrating an exemplary method for determining a device regulation parameter and a self-testing parameter according to some embodiments of the present disclosure.

FIG. 5 is another flowchart illustrating an exemplary method for determining a device regulation parameter and a self-testing parameter according to some embodiments of the present disclosure. In some embodiments, process 500 may be executed by the emergency supervision management platform 130.

In 510, a plurality of candidate device regulation parameters are obtained.

A candidate device regulation parameter refers to a device regulation parameter that is candidate for use. More descriptions regarding the device regulation parameter may be found in operation 230 and related descriptions thereof. In some embodiments, the emergency supervision object platform 150 may randomly select to shut down or turn down the gas pipeline and/or the gas usage device to generate the candidate device regulation parameter and upload it to the emergency supervision management platform 130.

In 520, future store gas data is predicted based on current store gas data and historical store gas data.

The future store gas data characterizes the store gas data that the commercial store is expected to have in the future. More descriptions regarding the store gas data may be found in the related descriptions in operation 210 in FIG. 2. In some embodiments, the emergency supervision management platform 130 may use the current store gas data and historical store gas data at a certain time point as the future store gas data at the same time point for the next month (or next few months).

In 530, a predicted damage risk corresponding to each of the plurality of candidate device regulation parameters is determined based on the plurality of candidate device regulation parameters, the future store gas data, and aging data.

The predicted damage risk is used to characterize the probability of damage to each gas pipeline and each gas usage device at a certain time point in the future. The predicted damage risk may be represented by data from 0 to 1.

In some embodiments, the emergency supervision management platform 130 may determine predicted damage risks at a plurality of future time points through a risk prediction model based on each candidate device regulation parameter, the future store gas data, the aging data, the operational efficiency data, the pipeline feature data, and the device feature data.

Figure 6:
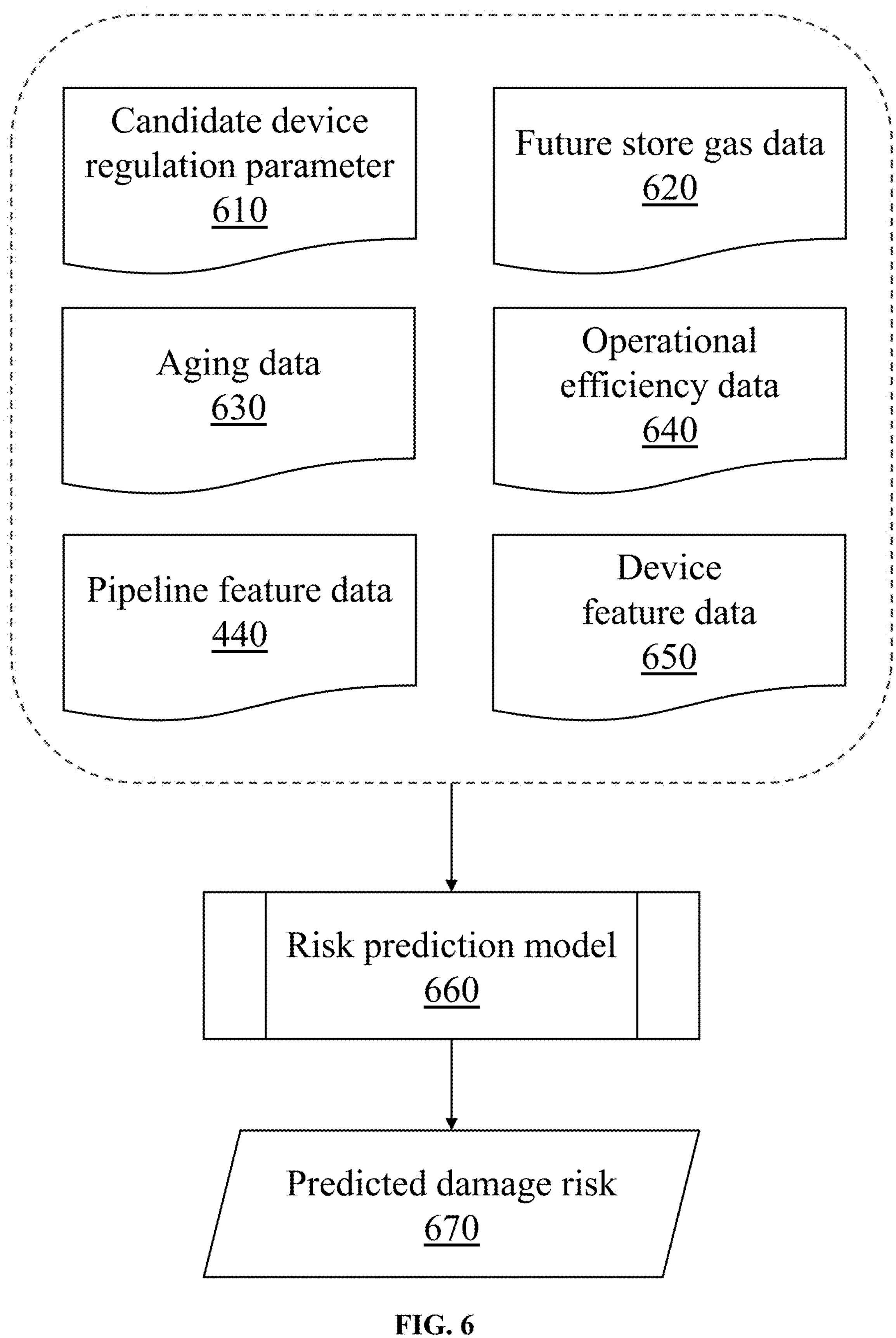
FIG. 6 is a schematic diagram illustrating an exemplary risk prediction model according to some embodiments of the present disclosure.

FIG. 6 is a schematic diagram illustrating an exemplary risk prediction model according to some embodiments of the present disclosure.

In some embodiments, the risk prediction model may be a machine learning model. For example, the risk prediction model may be a recurrent neural network (RNN) model or a combination of one or more of the other customized models.

In some embodiments, as shown in FIG. 6, inputs of a risk prediction model 660 may include a candidate device regulation parameter 610, future store gas data 620, aging data 630, operational efficiency data 640, pipeline feature data 440, and device feature data 650, and an output of the risk prediction model 660 may include a predicted damage risk 670.

In some embodiments, the risk prediction model may be obtained by training a plurality of second training samples with second labels. The second training samples may include a sample candidate device regulation parameter, sample future store gas data, sample aging data, sample operational efficiency data, sample pipeline feature data, and sample device feature data collected at a first historical time point. The second labels may include an actual predicted damage risk collected at a second historical time point. The second historical time point follows the first historical time point. The second label may be obtained by manual labeling, e.g., if a gas pipeline and/or a gas usage device at the second historical time point is damaged, the label is noted as 1, and vice versa as 0.

The training of the risk prediction model is same as the training of the aging determination model, which may be referred to in descriptions above.

It is possible to improve the prediction accuracy of the damage risk by predicting the damage risk through the risk prediction model, which makes the data processing efficiency high and the intelligence degree high at the same time.

In 540, a device regulation parameter and a self-testing parameter are determined based on the predicted damage risk corresponding to each of the plurality of candidate device regulation parameters.

In some embodiments, the emergency supervision management platform 130 may determine a risk composite score based on the predicted damage risks of each candidate device regulation parameter at the plurality of future time points, determine the device regulation parameter based on the risk composite score, and determine the self-testing parameter based on the device regulation parameter.

The risk composite score is used to evaluate a composite damage probability of the gas pipeline or the gas pipeline at the plurality of future time points based on a certain candidate device regulation parameter. Merely by way of example, the risk composite score of the candidate device regulation parameter may be determined by the following formula (2):

$$M = \sum_{j=1}^{m} \alpha_j R_j. \tag{2}$$

M denotes the risk composite score of the candidate device regulation parameter; $\alpha_j$ denotes a risk coefficient of a time point risk $R_j$ at a jth future time point, and $\alpha_1 > \alpha_2 > \ldots > \alpha_m$. $R_j$ denotes a time point risk at the jth future time point; m denotes a total count of future time points; $1 \leq j \leq m$, and the smaller the value of j, the closer the future time point close to the current time point.

The time point risk refers to a sum of corrected values of the predicted damage risks corresponding to a plurality of gas pipelines and gas usage devices at a future time point. In some embodiments, the emergency supervision management platform 130 may perform a risk classification and a correction on the predicted damage risks of the plurality of gas pipelines and gas usage devices at the future time point for a certain candidate device regulation parameter. For example, the emergency supervision management platform 130 may classify the plurality of predicted damage risks into a low risk, a medium risk, and a high risk. The low risk includes predicted damage risks that are greater than 0 and less than or equal to a first threshold, with corresponding correction values of 0. The medium risk includes predicted damage risks that are greater than the first threshold and less than or equal to a second threshold, with corresponding correction values of predetermined values between the first threshold and the second threshold. The high risk includes predicted damage risks that are greater than the second threshold and less than or equal to 1, with corresponding correction values of the predicted damage risks. The first threshold, the second threshold may be set by a person skilled in the art based on experience, and the first threshold is less than the second threshold.

The emergency supervision management platform 130 determines the risk composite scores corresponding to the plurality of candidate device regulation parameters by the equation (2), designates a candidate device regulation parameter with a smallest risk composite score as the device regulation parameter, and designates self-testing devices in the gas pipelines involved in the device regulation parameter and in associated pipelines of the gas usage devices as the self-testing parameter. For example, if the device regulation parameter is {stop a gas pipeline 1 and a gas usage device 3}, then the corresponding self-testing parameter is {start a self-testing device in the associated pipelines of the gas pipeline 1 and the gas usage device 3}.

By determining the device regulation parameter and the self-testing parameter by predicting the future store gas data and the predicted damage risk, possible future events are taken into account, which improves the accuracy of determining the device regulation parameter and the self-testing parameter, thereby enhancing the effectiveness of risk prevention.

In some embodiments, the emergency supervision management platform 130 may also determine a compensation coefficient based on aging impact data corresponding to each of the plurality of candidate device regulation parameters, determine the time point risk based on the compensation coefficient and the predicted damage risk, determine the risk composite score based on the time point risk, and determine the device regulation parameter and the self-testing parameter based on the risk composite score.

In some embodiments, the emergency supervision management platform 130 may determine a weighted sum of the corrected values of the predicted damage risks corresponding to the plurality of gas pipelines and the gas usage devices at a future time point and designate the result of the weighted sum as the time point risk at the future time point. A weight corresponding to a corrected value of a predicted damage risk is the compensation coefficient of the gas pipeline or the gas usage device.

In some embodiments, the emergency supervision management platform 130 may designate pipeline impact data as the compensation coefficient corresponding to the gas pipeline and designate device impact data as the compensation coefficient corresponding to the gas usage device.

More descriptions regarding determining the risk composite score, the device regulation parameter, and the self-testing parameter may be found in operation 540 and related descriptions thereof.

In operation 540, the time point risk is the sum of the corrected values of the predicted damage risks of each gas pipeline and each gas usage device, i.e., each gas pipeline and each gas usage device has the same degree of influence on the overall risk by default. However, the aging degree of different gas pipelines and gas usage devices may be different, the gas pipeline and gas usage device with high aging degree have higher probability of leakage and more serious consequences of accidents, whose impact on the overall risk is much greater than other gas pipelines and gas usage devices. Therefore, the time point risk can be more accurately evaluated by introducing the compensation coefficient to determine the impact of the aging degrees of the gas pipeline and the gas usage device on the time point risk.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

What is claimed is:

1. An Internet of Things (IoT) large model system for emergency supervision of smart city catering stores, comprising an emergency supervision user platform, an emergency supervision service platform, an emergency supervision management platform, an emergency supervision sensor network platform, and an emergency supervision object platform, wherein the emergency supervision management platform is configured to:

obtain store gas data from a store monitoring device installed in a store based on the emergency supervision object platform;

obtain pipeline distribution data from an integrated governmental supervision database;

obtain pipeline monitoring data from a pipeline monitoring device of a gas pipeline based on the emergency supervision object platform;

construct an aging feature map based on the pipeline distribution data, the pipeline monitoring data, the store gas data, and pipeline feature data; determine aging data based on the aging feature map;

wherein the aging data includes a device aging degree of a gas usage device and a pipeline aging degree of a store pipeline system;

determine the pipeline aging degree based on the pipeline monitoring data, the store gas data, and operational efficiency data; and determine a device regulation parameter and a self-testing parameter based on the pipeline aging degree and the device aging degree, and send the device regulation parameter to a gas control device and send the self-testing parameter to a self-testing device, wherein the device regulation parameter includes an opening regulation value and a power regulation value; control an opening amplitude of a pipeline valve based on the opening regulation value and control an operating power of the gas usage device based on the power regulation value; and control starting and stopping of the self-testing device based on the self-testing parameter.

2. The IoT large model system according to claim 1, wherein the emergency supervision management platform is further configured to:

generate a leak alarm parameter based on the aging data and send the leak alarm parameter to a leak alarm device of the store, wherein the leak alarm parameter controls triggering of the leak alarm device based on a leak alarm threshold, and the leak alarm device is configured to issue an alarm in response to a monitoring gas concentration being greater than the leak alarm threshold.

3. The IoT large model system according to claim 1, wherein the emergency supervision management platform is further configured to determine, based on the pipeline aging degree of associated pipelines of the gas usage device, the device aging degree of the gas usage device.

4. The IoT large model system according to claim 1, wherein the emergency supervision management platform is further configured to determine aging impact data based on the store gas data and gas storage location data; determine a judgmental threshold based on the aging impact data; and determine the device regulation parameter and the self-testing parameter based on the judgmental threshold and the aging data.

5. The IoT large model system according to claim 1, wherein the aging feature map includes nodes and edges, and node features of the nodes and edge features of the edges correspond to different time features.

6. The IoT large model system according to claim 1, wherein the emergency supervision management platform is further configured to determine a pressure alarm parameter based on the aging data, the pipeline feature data, and the pipeline monitoring data, and send the pressure alarm parameter to a pressure alarm device of the store, wherein the pressure alarm parameter controls triggering of the pressure alarm device based on a safe pressure threshold, and the pressure alarm device is configured to issue an alarm in response to a pressure of a pipeline of the store pipeline system being greater than the safe pressure threshold.

7. The IoT large model system according to claim 1, wherein the emergency supervision management platform is further configured to:

obtain a plurality of candidate device regulation parameters;

predict future store gas data based on current store gas data and historical store gas data;

determine a predicted damage risk corresponding to each of the plurality of candidate device regulation parameters based on the plurality of candidate device regulation parameters, the future store gas data, and the aging data; and determine the device regulation parameter and the self-testing parameter based on the predicted damage risk corresponding to each of the plurality of candidate device regulation parameters.

8. The IoT large model system according to claim 7, wherein the emergency supervision management platform is further configured to:

determine a compensation coefficient based on aging impact data corresponding to each of the plurality of candidate device regulation parameters;

determine a time point risk based on the compensation coefficient and the predicted damage risk;

determine a risk composite score based on the time point risk; and determine the device regulation parameter and the self-testing parameter based on the risk composite score.

9. A method for emergency supervision of smart city catering stores, wherein the method is executed by an emergency supervision management platform of an Internet of Things (IoT) large model system for emergency supervision of smart city catering stores, and the method comprises:

obtaining store gas data from a store monitoring device installed in a store based on an emergency supervision object platform;

obtaining pipeline distribution data from an integrated governmental supervision database;

obtaining pipeline monitoring data from a pipeline monitoring device of a gas pipeline based on the emergency supervision object platform;

constructing an aging feature map based on the pipeline distribution data, the pipeline monitoring data, the store gas data, and pipeline feature data; determining aging data based on the aging feature map;

wherein the aging data includes a device aging degree of a gas usage device and a pipeline aging degree of a store pipeline system;

determining the pipeline aging degree based on the pipeline monitoring data, the store gas data, and operational efficiency data; and determining a device regulation parameter and a self-testing parameter based on the device aging degree, and sending the device regulation parameter to a gas control device and sending the self-testing parameter to a self-testing device, wherein the device regulation parameter includes an opening regulation value and a power regulation value; controlling an opening amplitude of a pipeline valve based on the opening regulation value and controlling an operating power of the gas usage device based on the power regulation value; and controlling starting and stopping of the self-testing device based on the self-testing parameter.

10. The method according to claim 9, further comprising:

generating a leak alarm parameter based on the aging data and send the leak alarm parameter to a leak alarm device of the store, wherein the leak alarm parameter controls triggering of the leak alarm device based on a leak alarm threshold, and the leak alarm device is configured to issue an alarm in response to a monitoring gas concentration being greater than the leak alarm threshold.

11. The method according to claim 9, further comprising: determining, based on the pipeline aging degree of associated pipelines of the gas usage device, the device aging degree of the gas usage device.

12. The method according to claim 9, further comprising: determining aging impact data based on the store gas data and gas storage location data; determine a judgmental threshold based on the aging impact data; and determine the device regulation parameter and the self-testing parameter based on the judgmental threshold and the aging data.

13. The method according to claim 9, wherein the aging feature map includes nodes and edges, and node features of the nodes and edge features of the edges correspond to different time features.

14. The method according to claim 9, further comprising: determining a pressure alarm parameter based on the aging data, the pipeline feature data, and the pipeline monitoring data, and sending the pressure alarm parameter to a pressure alarm device of the store, wherein the pressure alarm parameter controls triggering of the pressure alarm device based on a safe pressure threshold, and the pressure alarm device is configured to issue an alarm in response to a pressure of a pipeline of the store pipeline system being greater than the safe pressure threshold.

15. The method according to claim 9, further comprising:

obtaining a plurality of candidate device regulation parameters;

predicting future store gas data based on current store gas data and historical store gas data;

determining a predicted damage risk corresponding to each of the plurality of candidate device regulation parameters based on the plurality of candidate device regulation parameters, the future store gas data, and the aging data; and determining the device regulation parameter and the self-testing parameter based on the predicted damage risk corresponding to each of the plurality of candidate device regulation parameters.

16. The method according to claim 15, further comprising:

determining a compensation coefficient based on aging impact data corresponding to each of the plurality of candidate device regulation parameters;

determining a time point risk based on the compensation coefficient and the predicted damage risk;

determining a risk composite score based on the time point risk; and determining the device regulation parameter and the self-testing parameter based on the risk composite score.

* * * * *